United States Patent
Lee et al.

(10) Patent No.: US 10,048,165 B2
(45) Date of Patent: Aug. 14, 2018

(54) TWO-DIRECTIONAL RADIAL LOAD AND MISALIGNMENT TESTING DEVICE

(71) Applicant: Southwest Research Institute, San Antonio, TX (US)

(72) Inventors: Peter M. Lee, Fair Oaks Ranch, TX (US); Kevin L. Hoag, San Antonio, TX (US); Riccardo Meldolesi, Hove (GB); Anthony Perkins, West Sussek (GB); John W. Miller, Lascassas, TN (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 110 days.

(21) Appl. No.: 15/350,761

(22) Filed: Nov. 14, 2016

(65) Prior Publication Data

US 2018/0136080 A1    May 17, 2018

(51) Int. Cl.
   *G01M 13/04* (2006.01)
   *F16C 9/02* (2006.01)

(52) U.S. Cl.
   CPC .............. *G01M 13/04* (2013.01); *F16C 9/02* (2013.01); *F16C 2360/22* (2013.01)

(58) Field of Classification Search
   CPC . G01M 13/04; G01M 13/045; F16C 2360/22; F16C 9/02; F16C 2233/00
   See application file for complete search history.

(56) References Cited

U.S. PATENT DOCUMENTS

| | | | | |
|---|---|---|---|---|
| 4,038,863 A * | 8/1977 | Mellor | .................. | G01N 19/02 73/9 |
| 4,672,838 A * | 6/1987 | Reh | ........................ | G01D 21/00 73/9 |
| 5,133,211 A * | 7/1992 | Brown | .................. | G01M 13/04 73/115.07 |
| 7,080,565 B2 * | 7/2006 | Delair | ................. | G01M 13/027 73/862.325 |
| 9,151,684 B2 * | 10/2015 | Nivet | ........................ | G01L 1/16 |
| 9,366,611 B2 * | 6/2016 | Jung | .................... | G01M 13/045 |
| 9,689,776 B2 * | 6/2017 | Meldolesi | ............. | G01M 13/04 |

OTHER PUBLICATIONS

Strand, H.; "Design, Testing and Analysis of Journal Bearings for Construction Equipment"; KTH Industrial Engineering and Management; Doctoral Thesis, Dept. of Machine Design, Royal Institute of Technology, Stockholm, Sweden, 2005, 11 pgs.; ISBN 91-7178-142-0.

* cited by examiner

*Primary Examiner* — Freddie Kirkland, III
(74) *Attorney, Agent, or Firm* — Grossman, Tucker et al

(57) ABSTRACT

A testing rig and method of testing a bearing with the rig, wherein the rig includes a bearing housing, wherein said bearing housing includes an opening and a drive shaft extending into said opening, wherein the drive shaft is rotatable around a bearing axis. The testing rig also includes a vertical actuator mounted on the bearing housing for applying a vertical load to the bearing housing and a horizontal actuator mounted on the bearing housing for applying a horizontal load to the bearing housing. In addition, the testing rig includes a first misalignment actuator coupled to the first actuator for applying a first misalignment load to the bearing housing and a second misalignment actuator coupled to the bearing housing for applying a second misalignment load to the bearing housing.

20 Claims, 14 Drawing Sheets

TWO-DIRECTIONAL RADIAL LOAD AND MISALIGNMENT TESTING DEVICE

FIELD

The present disclosure is directed to a two-directional radial load and misalignment testing device for testing engine bearings.

BACKGROUND

To address fuel economy and vehicle regulation, a focus has been placed on increasing thermodynamic efficiencies and lowering mechanical losses. In particular, crankshaft bearings, lubricants and additives are the subject of research and development as they contribute to mechanical losses exhibited in an engine. The development of bearing friction reduction technologies including bearings, lubricant, additives as well as coatings and materials would be facilitated by dedicated testing rigs that provide a reliable indication of ultimate performance in an engine. In particular, it is desirable to develop a testing rig that closely replicates the load and other operating conditions experienced by engine bearings over a wide range of speeds and loads. One functional capability of interest is the ability to evaluate the effects of dynamic misalignment.

One interest in bearing development is the replacement of plain bearings with roller bearings. A particular challenge for roller bearings, however, is operation under considerable levels of angular misalignment, generated by the deformation (or displacement) of the crankshaft and engine block under relatively high load (and speed) operation. While the ability to simulate angular misalignment under high load and speed may be desirable, it was contemplated that the implementation of such a feature may lead to unacceptable loss of stiffness in the testing system and consequent reduction of the performance achieved by the testing rig in terms of a reduction in load dynamics.

Thus, room remains for improvements in the design of testing rigs for crankshaft bearings, which better replicate engine operating conditions. In particular, replicating instantaneous load and angular misalignment histories of a crankshaft bearing when installed in an engine running at or near rated power is desirable. Testing rigs which manage to incorporate such a feature without significantly affecting system stiffness, would greatly enhance the potential of the rig as a research tool.

SUMMARY

An aspect of the present disclosure relates to a testing rig. The testing rig includes a bearing housing, wherein said bearing housing includes an opening and a drive shaft extending into said opening, wherein the drive shaft is rotatable around a bearing axis. The testing rig also includes a vertical actuator mounted on the bearing housing for applying a vertical load to the bearing housing and a horizontal actuator mounted on the bearing housing for applying a horizontal load to the bearing housing. In addition, the testing rig includes a first misalignment actuator coupled to the first actuator for applying a first misalignment load to the bearing housing and a second misalignment actuator coupled to the bearing housing for applying a second misalignment load to the bearing housing. Preferably, the vertical load is applied in a direction that defines a vertical load axis and the vertical load axis intersects the bearing axis, the horizontal load is applied in a direction that defines a horizontal load axis and the horizontal load axis intersects the bearing axis and the vertical load axis, the first misalignment load is applied in a direction that defines a first misalignment axis and the first misalignment axis intersects the vertical load axis and is parallel to the bearing axis, and the second misalignment load is applied in a direction that defines a second misalignment load axis that intersects the horizontal load axis and is parallel to the bearing axis.

In another aspect, the present disclosure relates to a method of testing a bearing operating conditions. The method includes rotating a bearing within a bearing housing around a bearing axis defined by the bearing, wherein the bearing is rotated by a drive shaft upon which the bearing is mounted. The method further includes applying a vertical load to the bearing housing and the bearing in a direction defining a vertical load axis that intersects the bearing axis with a vertical actuator mounted on the bearing housing and applying a horizontal load to the bearing housing and the bearing in a direction defining a horizontal load axis that intersects the bearing axis and the vertical load axis with a horizontal actuator mounted on the bearing housing. The method also includes applying a first misalignment load to the vertical actuator with a first misalignment actuator, wherein the first misalignment load intersects the vertical load axis and is parallel to the bearing axis to twist the bearing housing around the horizontal load axis; and applying a second misalignment load to the bearing housing, wherein the second misalignment load intersects the horizontal load axis and is parallel to the bearing axis to twist the bearing housing around the vertical load axis.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure is directed to a bearing testing rig that periodically varies instantaneous misalignment of the bearing under test, while the bearing is being radially loaded, to replicate operating conditions experienced in a production engine. The rig may be utilized to test bearing and shaft design, including material performance and wear, as well as lubricating fluid performance, such as degradation, reactivity and viscosity. Preferably, the testing rig performs the following functions: rotate the test shaft at engine speed; supply similar, or the same, lubricants to the test bearing at similar, or the same, flow rates and temperature conditions as in an engine; apply loads to the bearing and drive shaft in a similar, or the same, magnitude and direction as an engine; apply misalignment couples to the bearing and shaft in similar, or the same, magnitude and direction as an engine; measure and record the conditions on the test bearing, and test a wide range of bearing sizes from light duty, 2.3 L gasoline engines, passenger car engines (6 L) to heavy duty engines (15 L).

Figure 1:
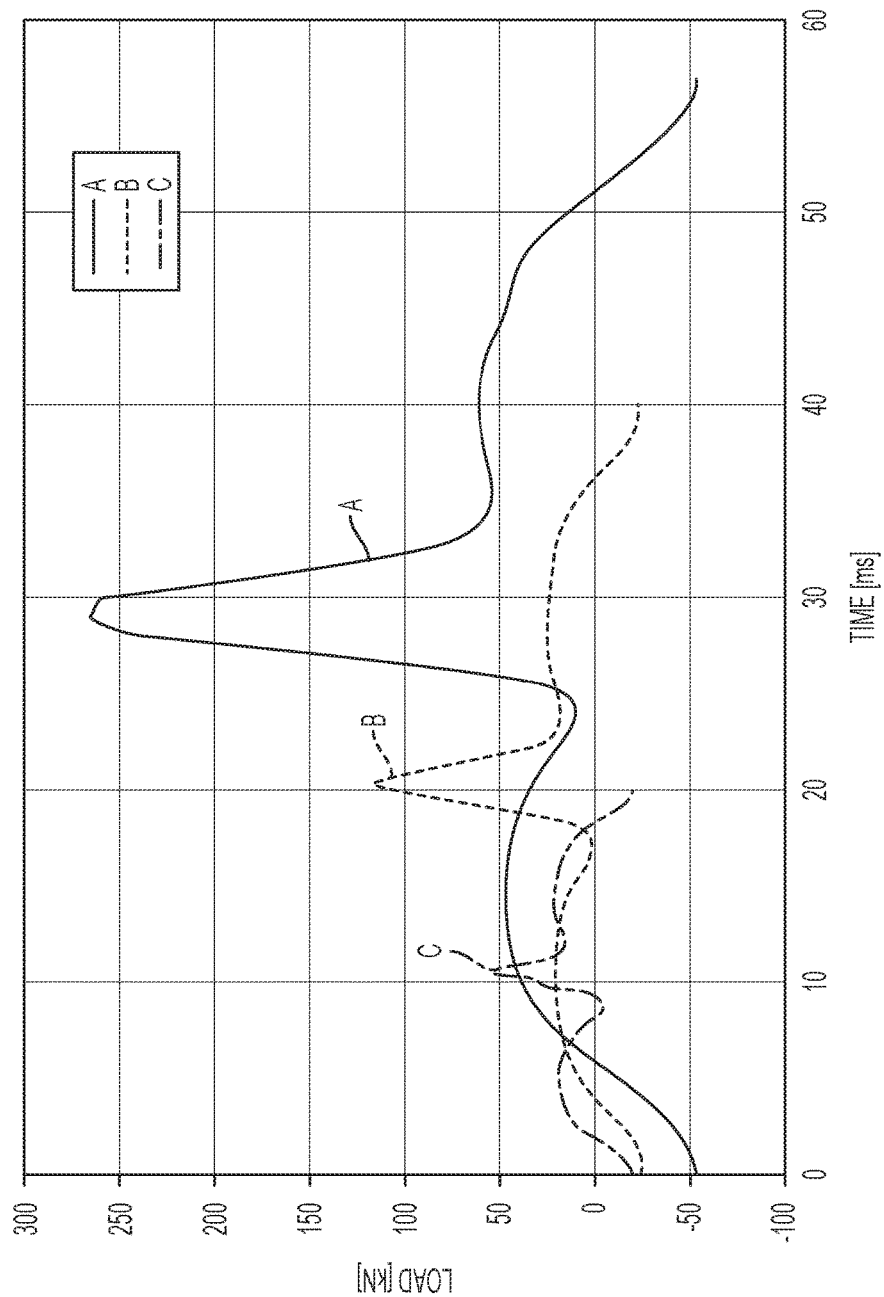
FIG. 1 is a graph of load history versus time for a single engine cycle of (A) a 15 L heavy duty diesel engine operating at 2100 rpm, (B) 1 6.7 L heavy duty diesel engine operating at 3,000 rpm, and (C) a 2.3 L light duty boosted gasoline engine operating at 6000 rpm.

The functional requirements of the test rig were based upon measured load histories of the connecting rod seen in test engines. FIG. 1 is a graph of the load history of the connecting rod big end bearing for three different engines at their rated power conditions. The engines include (A) a 15 L heavy duty diesel engine operating at 2,100 rpm, (B) a 6.7 L diesel medium duty engine operating at 3,000 rpm, and (C) a 2.3 L turbocharged gasoline engine operating at 6,000 rpm. The testing rig described herein utilizes relatively fast and powerful actuators, such as hydraulic actuators, in combination with relatively stiff rig architecture to meet these functional requirements.

Figure 2:
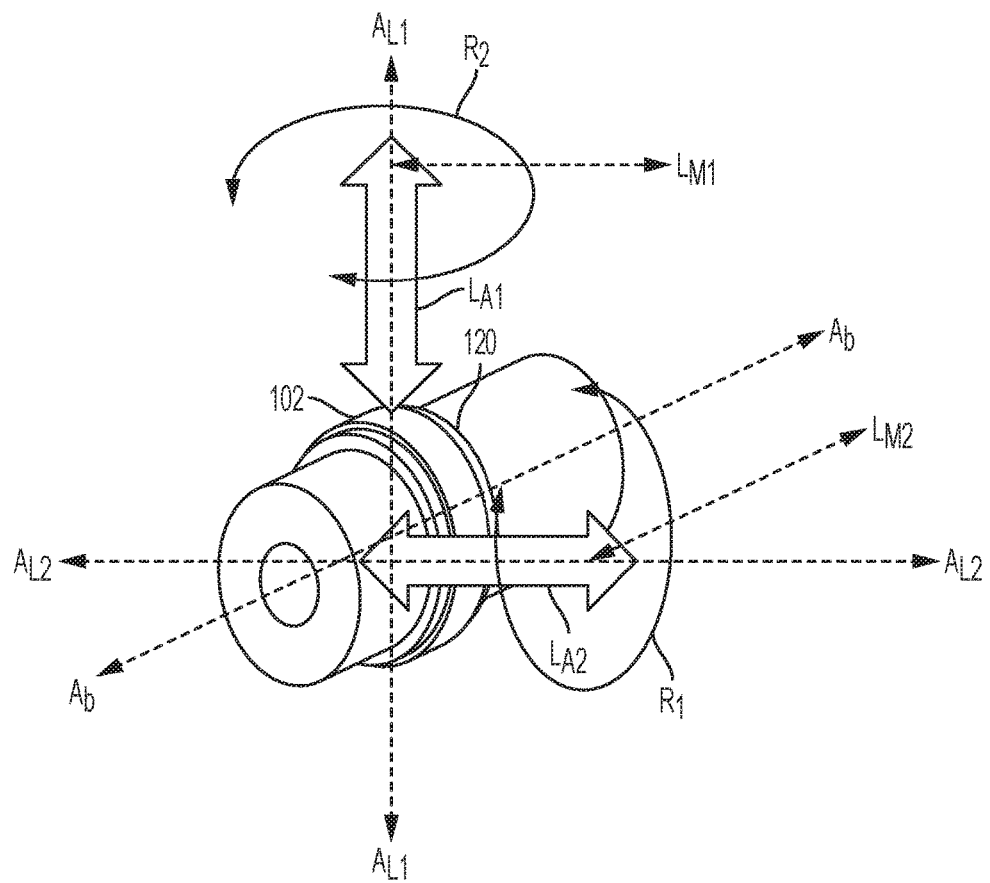
FIG. 2 illustrates a schematic of radial loads and misalignment couples applied to a test bearing placed on a test shaft.

The testing rig described herein is designed to apply radial loads, loads that intersect the axis of the bearing rotation, and misalignment couples along at least two axis transverse to the rotational axis of the bearing $A_b$. FIG. 2 illustrates the radial loads and misalignment couples the testing rig applies to the test bearing 102 and test shaft 120. As can be seen, the vertical load $L_{A1}$ and horizontal load $L_{A2}$ are applied in directions that generally define a vertical load axis $A_{L1}$ and a horizontal load axis $A_{L2}$. These axes are preferably perpendicular to the bearing axis $A_b$ and each other. Alternatively, the vertical load $L_{A1}$ and horizontal load $L_{A2}$ may be applied at angles other than 90 degrees to the bearing axis $A_b$ and each other, such as at angles in the range of 45 to 90 degrees, including all values and ranges therein, such as 60 to 90 degrees, 75 to 90 degrees, etc.

Similar to the applied loads $L_{A1}$, $L_{A2}$, the misalignment couples or loads may be applied by applying first and second misalignment loads $L_{M1}$, $L_{M2}$ against the testing apparatus, one at a vertical distance and one at a horizontal distance from the bearing axis $A_b$. The misalignment loads are illustrated as occurring in planes that are 90 degrees from each other and create rotational or twisting loads $R_1$ and $R_2$ around the horizontal load axis $A_{L2}$ and vertical load axis $A_{L1}$.

Figure 3A:
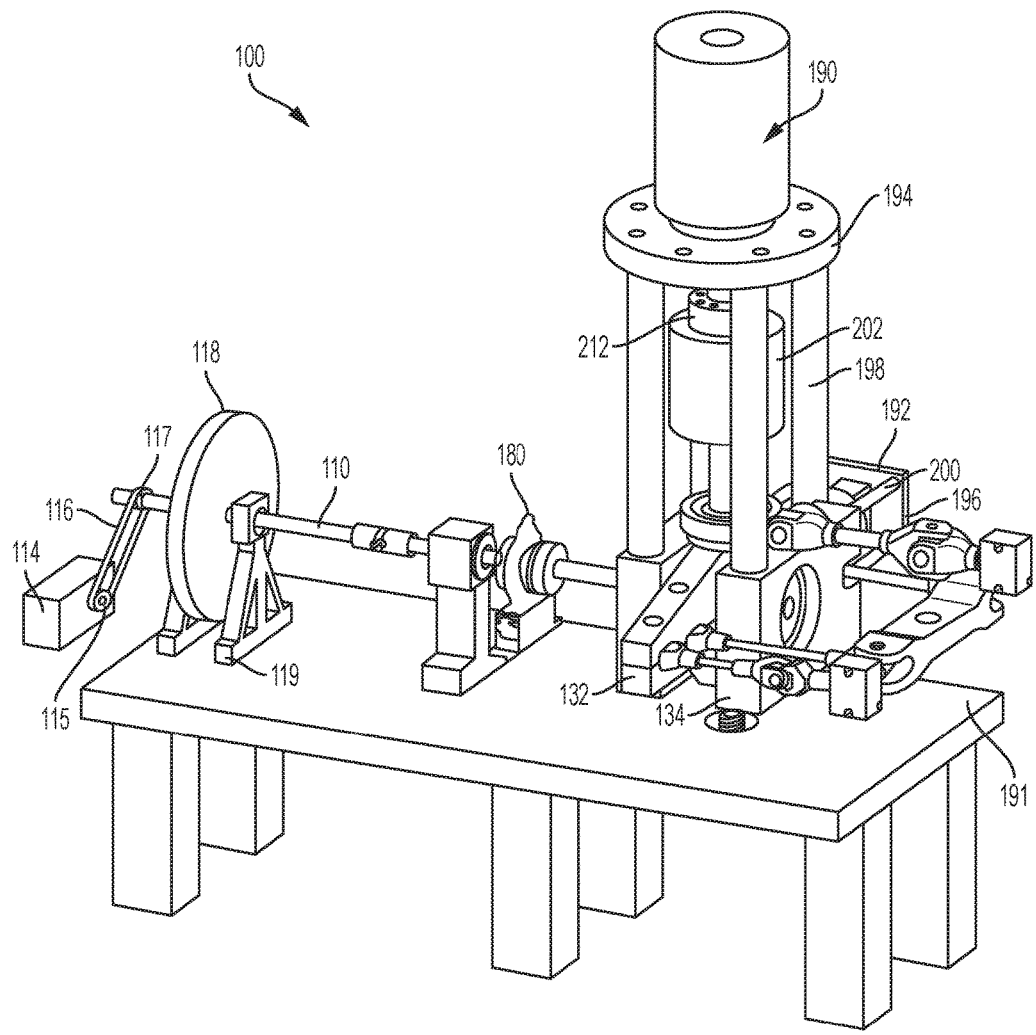
FIG. 3a illustrates a schematic of the testing rig.
Figure 3B:
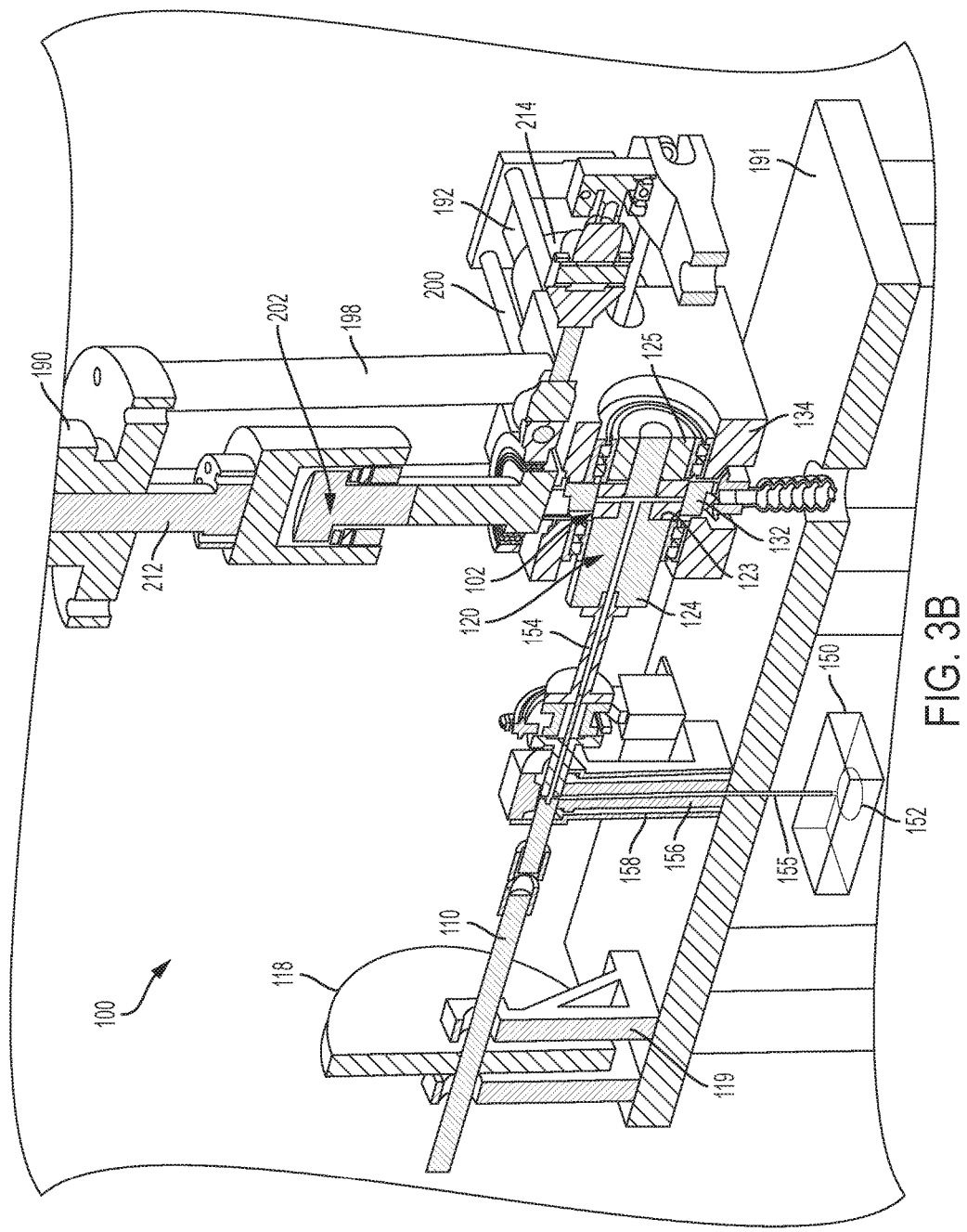
FIG. 3b illustrates a cross-sectional schematic of the testing rig of FIG. 3a taken in a plane coincident with the length of the axis of rotation of the bearing $A_b$.
Figure 4:
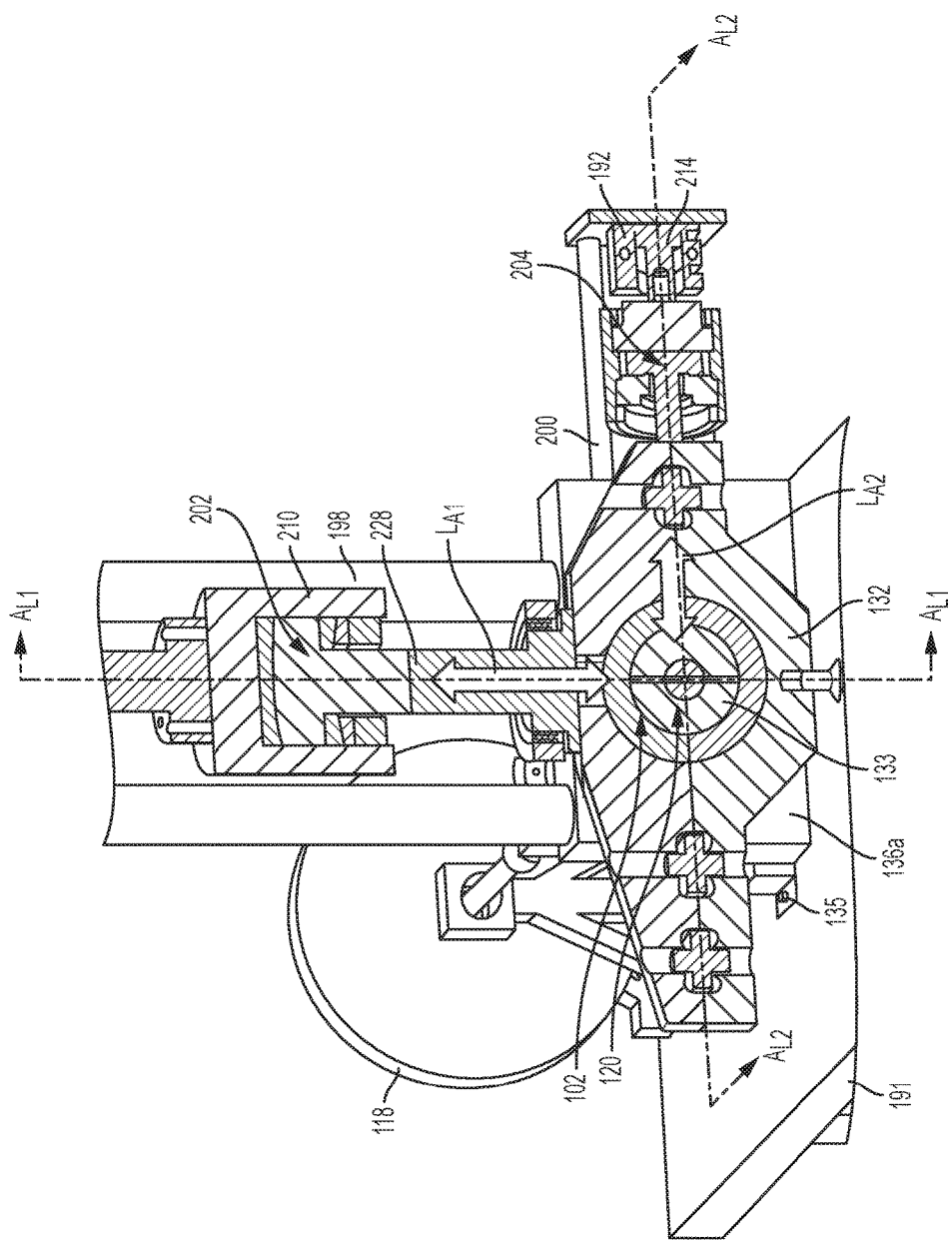
FIG. 4 illustrates a cross-sectional schematic of the testing rig of FIG. 3a taken in a plane coincident with the axis defined by the direction the axial loads are applied, intersecting the rotational axis of the bearing.

A schematic of the testing rig is illustrated in FIGS. 3a, 3b and 4. The testing rig 100 according to various embodiments herein includes a rotatable drive shaft 110. A drive shaft may be understood herein as a shaft that imparts rotation to the bearing 102, described further herein. The drive shaft is preferably rotated directly or indirectly by a drive motor 114. As illustrated, a drive belt 116 is used to drive the drive shaft 110, wherein the drive belt 116 is secured to pulleys 115, 117 provided at both the motor side 114 of the belt 116 and the drive shaft 110 side of the belt 116. At least one of the pulleys 115, 117 is interchangeable allowing for the use of different pulley sizes to be swapped into the system depending on the desire shaft speed, without adjusting the motor speed or changing the motor. A flywheel 118 is preferably mounted on the shaft 110, which adds inertia to the system to even out fluctuations in rotational speed. Preferably, the flywheel 118 is mounted near the driven end of the drive shaft 110, i.e., the end near the drive belt 116, and is supported by braces 119. The flywheel 118 may alternatively be mounted proximal to the bearing housing near the center of the drive shaft, or on the opposing end of the drive shaft.

In preferred embodiments, the drive shaft 110 includes a mandrel 124. As illustrated, the mandrel 124 is at the opposite end of the drive shaft 110 from the drive motor 114. A test shaft 120 is preferably mounted on the mandrel 124 and the mandrel 124 may be selected to accommodate the size of the test shaft 120. As illustrated, the mandrel 124 includes a shoulder 123 for positioning the test shaft 110 relative to the bearing housing, discussed further herein. In addition, a spacer ring 125 is mounted on the mandrel 124 opposing the test shaft 110 to retain the test shaft 120 on the mandrel 124. In examples, the test shaft 120 is selected from a material that is similar or the same as the crankshaft main journal or crank pin that the bearing is designed to be used in conjunction with. Further, the test shaft 120 is selected to exhibit a similar surface finish to the crankshaft main journal or crankpin that it simulates. Material characteristics that may be considered when selecting the test shaft include material composition, roughness, surface finish, coefficient of friction, etc. The outer surface of the test shaft 120 is called the running surface 121. As illustrated, the bearing 102 is mounted on the running surface 121 of the test shaft 120. The bearing may extend along the entire length of the test shaft 120 or may extend along a portion of the length of the test shaft as illustrated. In other embodiments, the bearing 102 may be mounted directly on the drive shaft 110 or mandrel 124 without providing a test shaft. Also shaft 120 and mandrel 124 could be in one piece.

The drive shaft 110 may then rotate the bearing at rates at engine operating speeds, such as in the range of 0 rpm to 9,000 rpm, including all values and ranges therein. The speed at which the bearing is being rotated at may be measured at the running surface 121 on which the bearing 102 is mounted. Alternatively, other reference points may be used, such as the outer surface of the bearing 102. As previously noted, the speed of rotation for a particular test shaft or bearing diameter may be adjusted by adjusting the motor speed, the pulley size or a combination thereof.

As illustrated in FIG. 4, the bearing housing 132 includes an opening 133 to receive the drive shaft 110 and the test bearing 102. The bearing housing 132 transfers loads to the test bearing 102 during testing as described further herein. The bearing housing 132 may be a single monolithic unit, or may be provided by securing multiple pieces of the housing together around the test bearing 102. In some embodiments, a connecting rod may form a portion of the bearing housing 132 to replicate specific engine configurations. The bearing housing 132 is mounted within the main housing 134.

Figure 5:
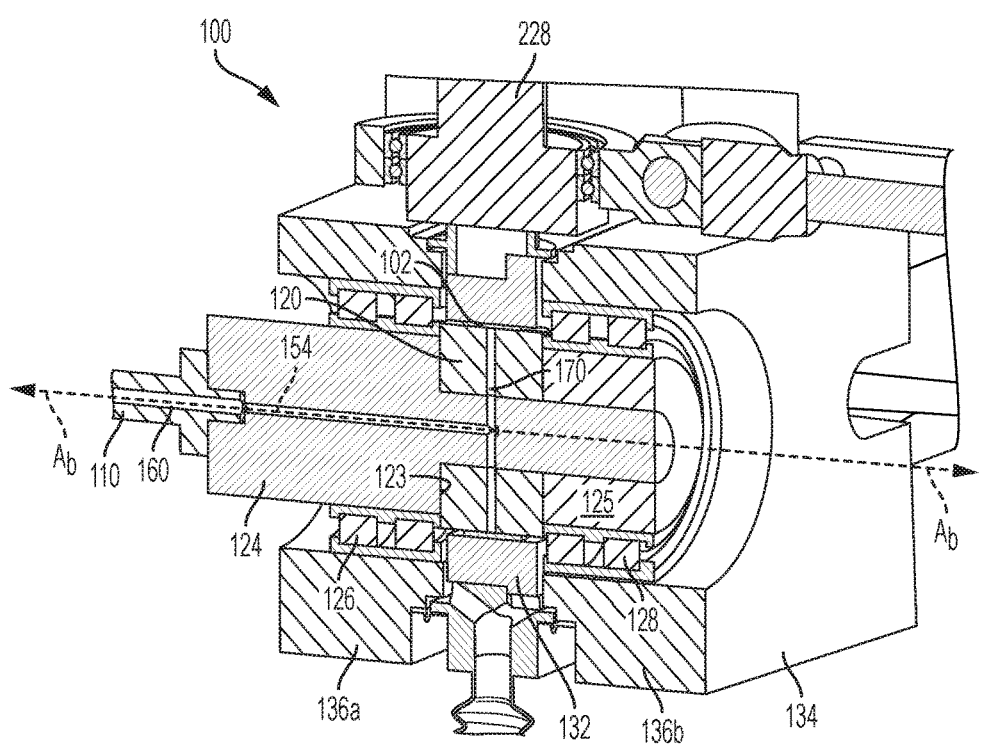
FIG. 5 illustrates a cross-sectional schematic of the testing rig of FIG. 3a taken in a plane coincident with the length of the axis of rotation.

Turning to FIG. 5, the main housing 134 is affixed to the testing rig platform 191. The bearing housing 132 is held within the main housing 134 by the shaft and bearings and therefore floats and is at least partially rotatable relative to the testing rig platform 191. Preferably, the main housing 134 is bolted to the testing rig platform 191 with bolts 135 (see FIG. 4); however, other means of mechanically affixing the main housing 134 to the testing rig is contemplated. In embodiments, the main housing 134 includes two halves, a first half 136a and a second half 136b positioned at either end of the bearing 102. One or more support bearings 126, 128 are held within the main housing 134 on either or both sides of the bearing housing 132 and on either end of the bearing 102 to support the drive shaft 110 and in preferred embodiments the mandrel 124. The support bearings are preferably cylindrical in shape and include, for example, plain bearings, two-piece bearings or roller bearings. Particular attention may be paid to the maximum predicted operating loads (both radial and misalignment loads) when selecting the support bearings.

The bearing 102 used in testing, i.e., generally referred to herein as the test bearing for purposes of clarity, is situated on the drive shaft 110 and preferably the mandrel 124. The test bearing may be a split ring bearing, a plain bearing, or a two-piece plain bearing. However, other test bearings may be utilized as well, such as roller or ball bearings.

Figure 6:
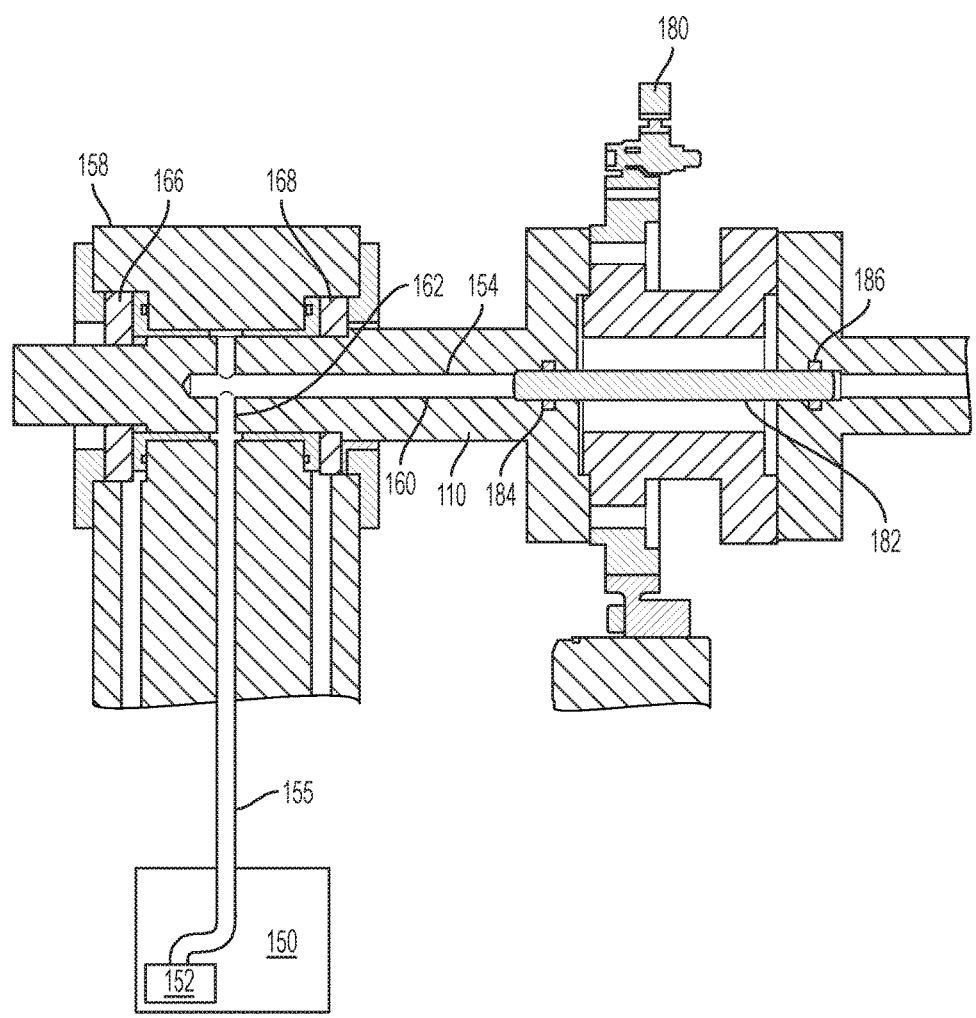
FIG. 6 illustrates a cross-section of the support block of the lubricating fluid supply and torque meter.

The testing rig includes a lubricating fluid supply, such as that illustrated in FIGS. 3b, 5 and 6. The lubricating fluid supply includes a lubricating fluid flow path 154. One or more storage tanks 150 may be provided to supply lubricating fluid to the flow path and receive used lubricating fluid from the flow path. For example, lubricating fluid is pumped from the tank 150 using a pump 152 through a lubricating fluid flow path 154. The lubricating fluid flow path preferably includes supply lines formed from hoses 155 and drilled lines 156 in a support block 158 through which the drive shaft 110 passes. The flow path 154 continues through the drive shaft 110, mandrel 124, and test shaft 120 by way of a cylindrical opening 160 that formed through the drive shaft 110, mandrel 124, and test shaft 120. The inlet 160 is fed by a radial drilling 162, which cuts through the radius of the drive shaft and is located in the drive shaft in a portion of the drive shaft that is coincident with a recess 164 in the support block that is in fluid communication with the drilled lines 156. Seals 166, 168 are positioned on either side of the radial drilling 162 in the drive shaft 110 between the drive shaft 110 and support block 158 to prevent lubricating fluid from seeping past the confines of the drive shaft 110 and support block 158.

The lubricating fluid then travels through the cylindrical opening 160 to the test bearing, exiting the cylindrical opening at another radial drilling 170 that provides an outlet at the running surface 121. Once ejected from the test bearing 130 the lubricating fluid drains through the bearing housing 132 and returns to the tank 150. Additional seals are provided between the test bearing and main housing, as well as between mating portions of the flow path 154. Lubricating fluid may alternatively be delivered into the test shaft opposing the drive shaft, near the main housing, eliminating the need to provide a flow path through the drive shaft. However, delivery of the lubricating fluid at this location may require high pressure, high temperature seals that would induce relatively high friction that may be difficult to measure. Alternatively, a hydrodynamic bearing may be used to deliver the lubricating fluid to the drive shaft.

The torque applied to the shaft is preferably measured. As illustrated in FIGS. 3a and 6, a torque meter 180 is provided. Instantaneous and average torque is measured over the engine cycle over a single revolution, in the case of a two stroke engine, or over two revolutions, in the case of a four stroke engine. To accommodate the torque meter, a gap may be required in the drive shaft 110 and lubricating fluid flow path 154. A sleeve 182 may be inserted to bridge the gap in the drive draft 110 and cylindrical opening 160 therein to accommodate the torque meter 180. Without being bound to a particular theory, it is believed that the support block 158 introduces a rotating friction and if place downstream of the torque meter may bias the measurement of test bearing friction. Accordingly, it is believed advantageous to place the support block 158 upstream of the torque meter 180 and feed oil through the center of the torque meter. Seals 184, 186 may be used to prevent the flow of lubricating fluid from out of the flow path 154. It is noted that the support bearings 126, 128 may contribute to the total measured friction therefore introducing an error, which may need to be accounted for. The error may be quantified by replacing the test bearing 120 with a roller bearing similar in nature, if not the same, as the supporting bearings, thus enabling identification of the friction contribution of such bearings. Alternative methods of measuring torque may also be used. For example, a strain gauge may be affixed to the shaft in the section between the supporting roller bearings and the test bearing.

To apply loads to the bearing housing 132, test bearing 102, and test shaft 120 when present, the testing apparatus also includes radial load actuators 190, 192, illustrated in FIGS. 3a, 3b and 4, for applying radial loads $L_{A1}$, $L_{A2}$ that replicate loads experienced by the main bearings and big end bearings during engine operation. The radial load actuators are preferably hydraulic cylinders and are described further herein as such; however, other actuators capable of delivering the desired forces at desired rates for the selected application may alternatively be utilized for applying radial loads. The radial load actuators are preferably capable of applying specific loads (defined as the force divided by the product of the bearing diameter and bearing axial length) up to 60 MPa, which may be experienced by the main bearing during operation, and up to 130 MPa, which may be experienced by the big end bearing during operation. Thus, the radial actuators may apply forces in the range of −100 kN to 350 kN, including all values and ranges therein and preferably −400 kN to 400 kN. Further, the forces may be rapidly changed in magnitude and direction in operation due to combustion and inertia at rates corresponding to the engine operating speed of 0 to 8,000 rpm, including all values and ranges therein.

While the hydraulic cylinders 190, 192 (radial load actuators) may be mounted directly to the bearing housing, they may also be mounted indirectly to the bearing housing 132 by mounting the actuators to the main housing 134. The hydraulic cylinders 190, 192 are mounted perpendicular to one another, i.e., 90 degrees apart from one another, radially around the bearing axis $A_b$, which passes through the center of the bearing. However, the hydraulic cylinders 190, 192 may alternatively be mounted in other configurations or at other angles around the axis as well, such as 45 degrees apart to 180 degrees apart, including all values and ranges from 45 to 179 degrees apart. In embodiments, the hydraulic cylinders may be two different sizes.

As illustrated, a relatively large cylinder 190 is mounted vertically over the bearing and a relatively smaller cylinder 192, as compared to the large cylinder, is mounted horizontally on the side of the bearing housing 132. The relatively large cylinder 190, as illustrated, applies vertical loads defining a vertical load axis $A_{L1}$ to the test bearing housing 132, preferably perpendicular to the bearing axis $A_b$. These loads are preferably in the range of −400 kN to 400 kN and applied at relatively rapid rates in the range of 0 to 8,000 rpm to replicate combustion loads. While the vertical is illustrated as being perpendicular to the testing rig platform 191, reference to vertical herein may be understood herein as being within plus or minus 90 degrees from perpendicular, allowing the loads to be applied, in some embodiments, horizontally.

The relatively smaller cylinder 192 applies horizontal loads defining a horizontal load axis $A_{L2}$ to the test bearing housing to replicate horizontal loads to the test bearing ho using 132, preferably perpendicular to the bearing axis $A_b$. These loads are preferably in the range of −200 kN to 200 kN and applied at relatively rapid rates in the range of 0 to 8,000 rpm to replicate combustion loads. While the horizontal is illustrated as being parallel to the testing rig platform 191, reference to horizontal herein may be understood herein as being within plus or minus 90 degrees from parallel and may, in embodiments, be vertical as alluded to above. In further embodiments, the relatively smaller and relatively larger cylinders may exhibit the same size to replicate the main bearings of a V engine.

Referring to FIG. 3a, the hydraulic cylinders 190, 192 are mounted on carrier plates 194, 196, which are each suspended above the main housing 134 by four columns 198, 200 mounted to the main housing 134. The carrier plates and columns may be interchanged depending on the bearing and cylinder size. It may also be appreciated that to replicate engines having horizontally opposed cylinders or other configurations, it may be desirable, to horizontally position the relatively larger horizontal hydraulic cylinder and vertically position the relatively smaller cylinder. Further, hydraulic cylinders of additional size may be mounted at various angles around the axis $A_b$ to provide additional radial loads.

Figure 9:
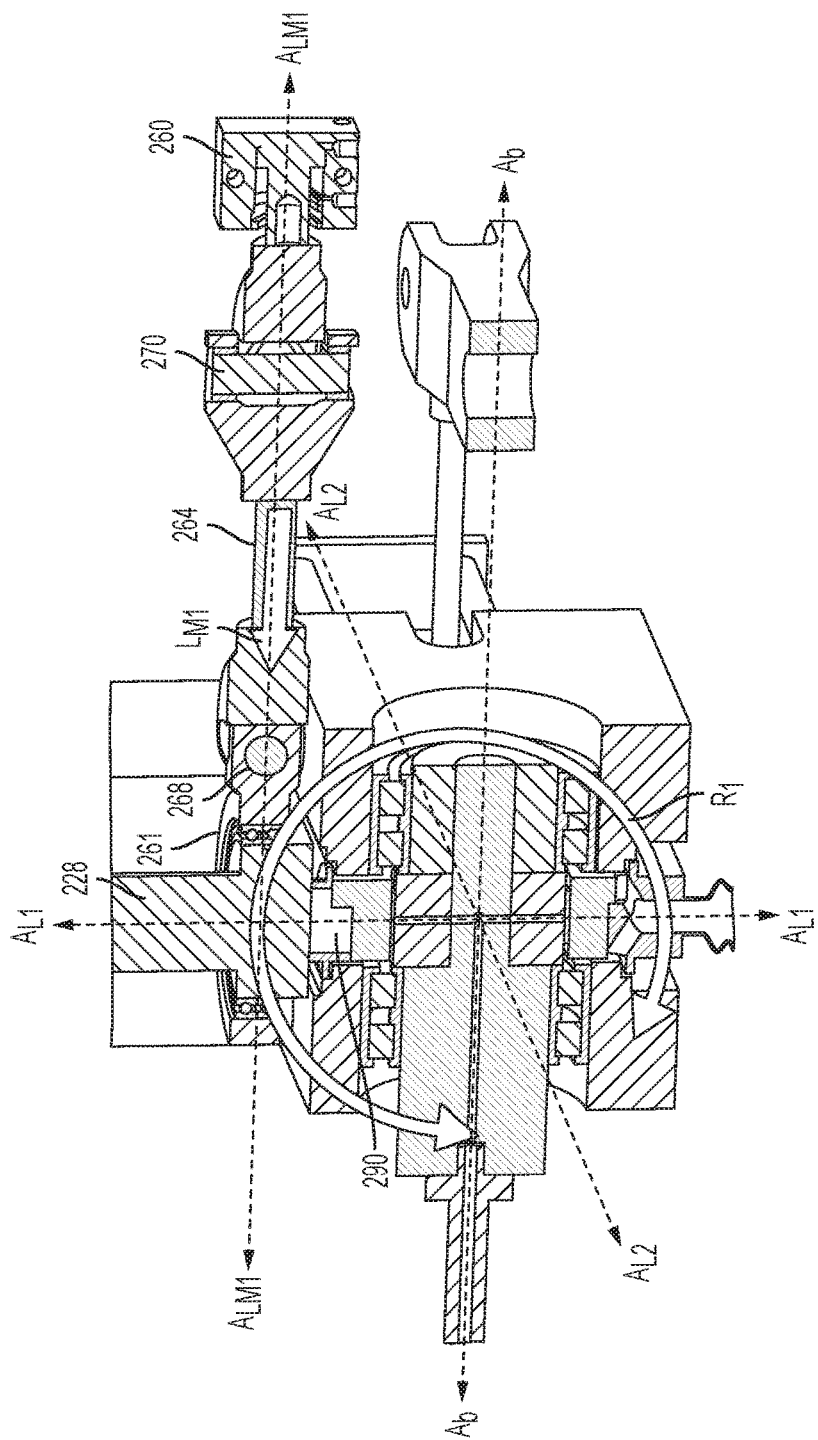
FIG. 9 illustrates a cross-section of the testing rig of FIG. 3a taken in a plane coincident with the axis of rotation of the bearing and the vertical radial load.

As noted above, it also is desirable to also impart angular misalignment to the bearings to replicate, for example, crankshaft deflections. Application of misalignment may be facilitated by including pivoting hydrostatic joints 202, 204 in the radial actuators 190, 192 by coupling the hydrostatic joints 202, 204 to the reciprocating pistons 212, 214 as seen in FIG. 9. The hydrostatic joints 202, 204 are then coupled to the bearing housing 132 so as to apply the radial loads to the bearing housing 132. Coupling the actuators to the bearing housing 132 allows for the application of loads in both vertical (up and down) directions and both horizontal (side to side) directions.

Figure 7:
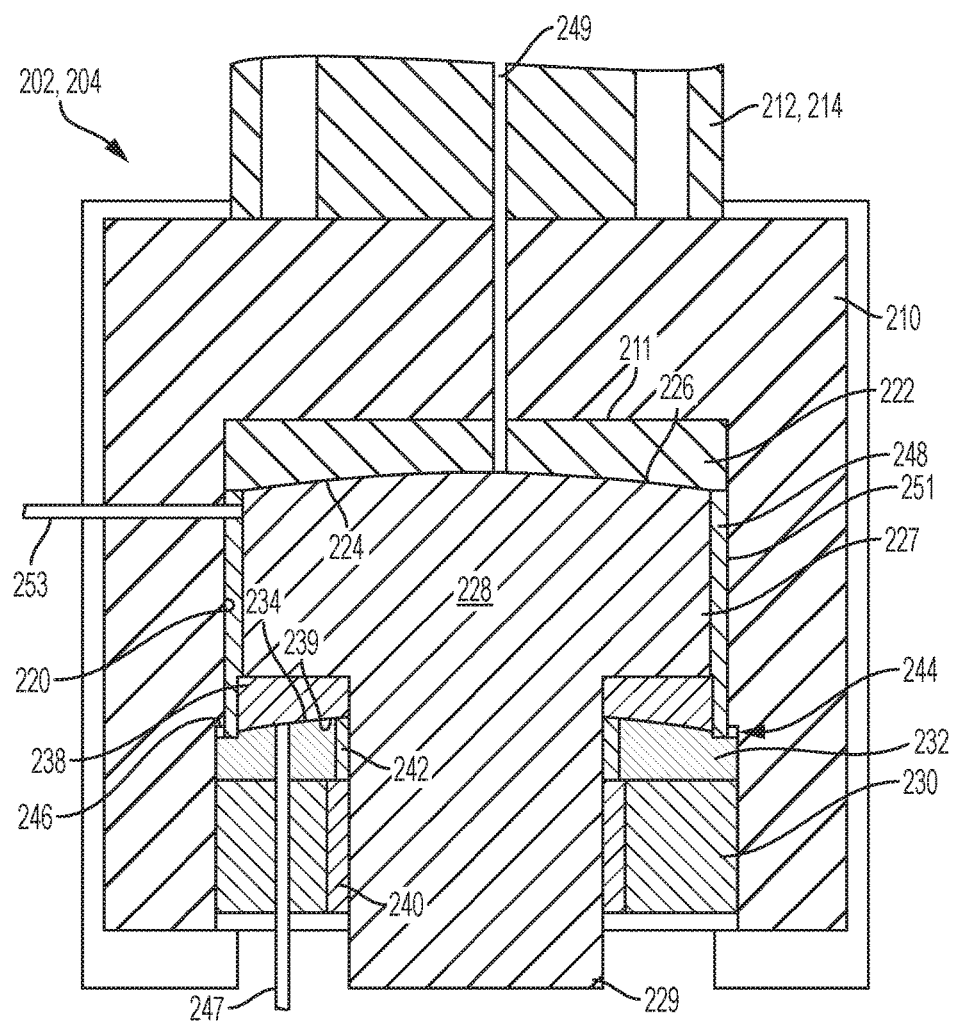
FIG. 7 illustrates a cross-section of a pivotable hydrostatic joint.

An embodiment of a hydrostatic joint 202, 204, which may be used in either radial actuator, is illustrated in FIG. 7. The joints 202, 204 each include a joint housing 210 and a joint leg 228. The joint housing 210 is connected at its top surface to the piston 212, 214 of the radial actuator. The joint leg 228 is received in the joint housing 210 and is connected to the bearing housing 132. The joint leg preferably includes a head portion 227 and a body portion 229, wherein the head portion exhibits a relatively larger diameter than the body portion.

The joint housing 210 defines a cup shaped opening 220 therein. At the top 211 of the housing 210 (or bottom of the cup, depending on perspective) is a plate 222 that has a concave arcuate surface 224 opposing the top of the housing. The arcuate surface is preferably in the form of a spherical cap (a portion of a sphere intersected by a plane). The center of the concave plate is coincident with the center of the test bearing 102 length and width (which is generally equal to the bearing diameter). The concave plate 222 mates with the spherical cap of the upper surface 226 of the joint leg head 227. In using the term mate or mating, it is understood that the two surfaces exhibit similar surface geometry such that the joint leg 228 slips relative the plate 222 allowing the joint leg 228 to pivot relative to the concave plate 222 and the joint housing 210. The head portion 227 of the joint leg 228 exhibits a relatively smaller diameter than that of the plate 222. Again, the body portion 229 of the joint leg 228 is connected with the bearing housing 132, as seen in FIG. 4, to transfer forces from the actuator to the bearing housing 132 and bearing 102.

Returning to FIG. 7, a mating ring 238 is placed around the joint leg body 229 at the bottom of the joint leg head 227. The mating ring 238 exhibits an arcuate, concave surface 239, which mates with a convex, arcuate surface 234 of a bottom joint ring 232 that is fixed in the joint housing by a locking ring 230. The arcuate surfaces are also preferably in the form of spherical caps. The locking ring 230 is positioned at the bottom portion of the joint housing 210 and holds the various components of the joint housing together. The center defined by the bottom ring 232 is coincident with the center of the test bearing 102 length and width. Again, mating implies that the two surfaces exhibit similar geometry such that they may slip relative to one another.

It is noted that the bottom joint ring 232 and the locking ring 230 include openings 240, 242 through which the joint leg body 229 passes. The opening diameter is sufficiently large enough that the joint leg 228 may pivot and the openings 240, 242 do not interfere with the joint leg 228 through the desired degree of motion of the joint leg 228. Further, the locking ring 230 and bottom joint ring 232 may be relatively larger in diameter than the head portion 227 of the joint leg 228 and plate 222. The larger diameter of the locking ring 230 and bottom joint ring 232 is received in a portion of the housing opening 220 that exhibits a relatively larger diameter than the portion of the housing opening 220 surrounding the joint leg 228 and plate 222. A spacer 244 may be provided between the shoulder 246 where the housing diameter changes and the bottom joint ring 232.

Preferably a clearance is provided between the various components of the assembly, such as between the plate 222 and joint leg 228, joint leg 228 and mating ring 238, mating ring 238 and bottom joint ring 232, and bottom joint ring 232 and locking ring 230. Total clearances between the components may range from 0.01 to 0.9 millimeters, including all values and ranges therein. Hydraulic fluid 248, under pressure, is provided in the joints and fills the clearances to provide hydrostatic support and reduce friction in operation through feed lines 247 and 249. The spacer 244 prevents hydraulic fluid 248 from leading out of the hydrostatic joint assembly. Feed line 247 extends through the joint housing 210 and plate 222 to supply oil between plate 222 and joint leg 228. Feed line 249 extends through the locking ring 230 and bottom joint ring 232 to supply oil between the bottom joint ring 232 and the mating ring 238. It should be appreciated that the fluid pressure, and not direct contact between the plate 222 and joint leg 228, as well as the mating ring 238 and bottom joint ring 232, transfers the loads between the hydraulic pistons and the bearing housing. Hydraulic fluid 248 seeps from between the plate 222 and joint leg 228 and from between the mating ring 238 and bottom joint ring 232 into a cavity 251 between the surrounding the joints and the housing 210. Hydraulic oil then preferably drains through drain line 253 into an oil pan.

Figure 8:
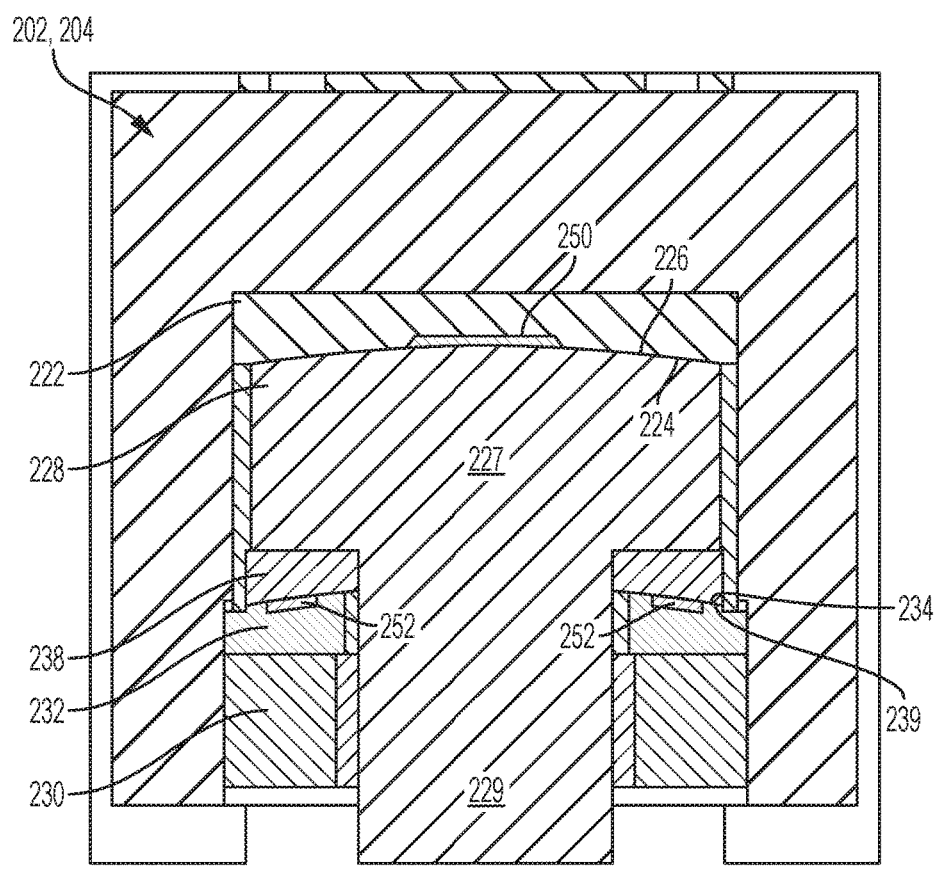
FIG. 8 illustrates a cross-section of another embodiment of a pivotable hydrostatic joint including recesses.

In alternative embodiments, joint leg 228 and mating ring 238 may be provided as a single component, rather than two separate components. Similarly, the locking ring 230 and bottom joint ring 232 may also be provided as a single component. Further, in embodiments, such as illustrated in FIG. 8, recesses 250, 252 may be provided in the plate 222 and the bottom joint ring 232 surfaces 224, 234, which provide reservoirs for the hydraulic fluid. Hydraulic fluid may be fed to the joints and these recesses from an external hydraulic circuit, or separate hydraulic fluid circuits may be used to feed fluid into the recesses. For example, the feed lines 247, 249, illustrated in FIG. 7, may open into or couple to the recesses. Further, the hydraulic circuit may be fed from the oil pan, which captures the oil.

Figure 10:
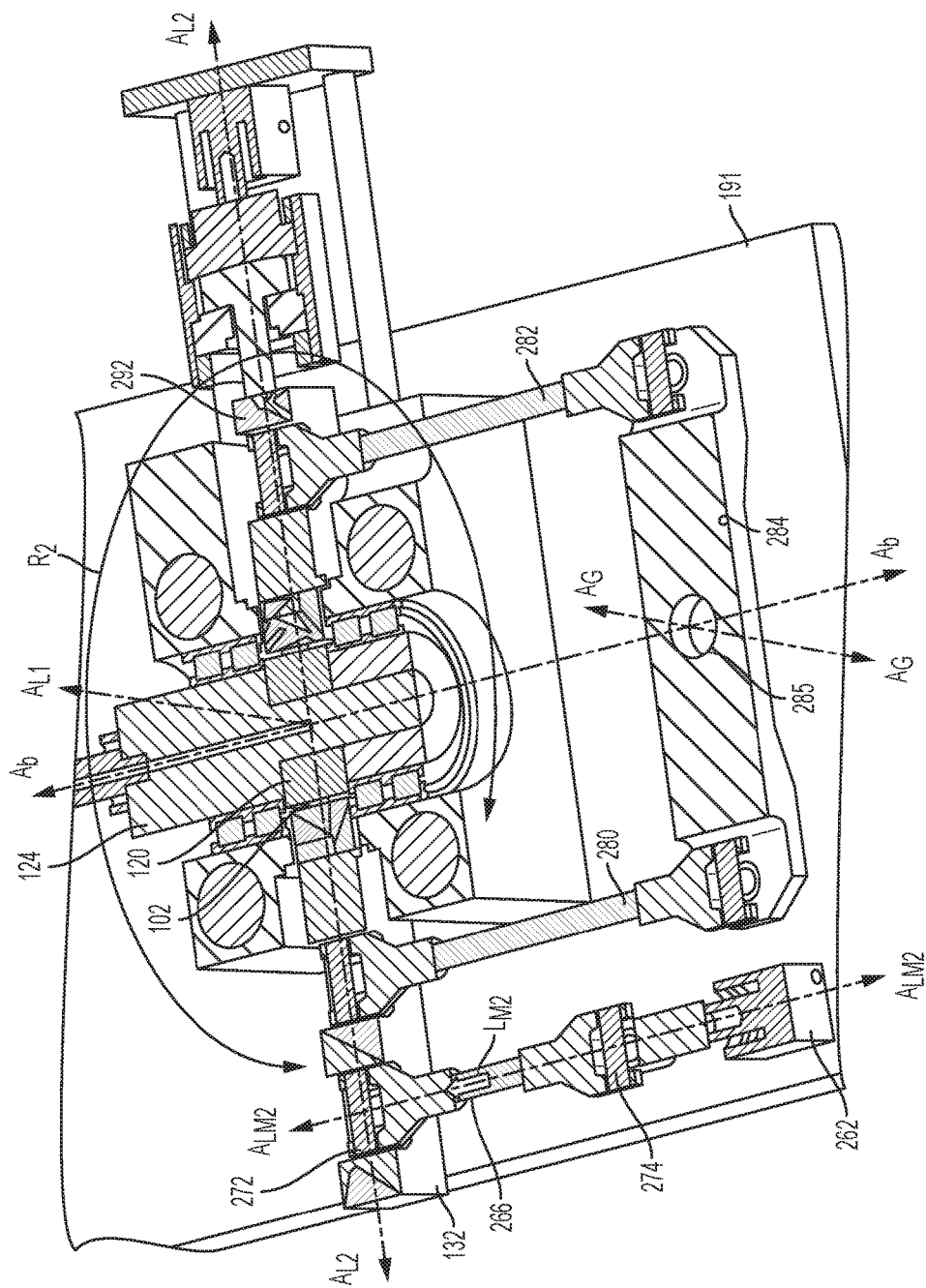
FIG. 10 illustrates a cross-section of the testing rig of FIG. 3a taken in a plane coincident with the axis of rotation and the horizontal radial load.

The arrangement allows for the hydraulic cylinders 190, 192 to apply vertical and horizontal radial loads in either direction, towards or away from the bearing axis $A_b$, and allows for a degree of motion when applying the misalignment couples. The misalignment couples are applied using relatively small actuators 260, 262 illustrated in FIGS. 9 and 10. The actuators 260, 262 are mounted at a distance from the bearing center, i.e., bearing axis $A_b$, and apply misalignment loads $L_{M1}$, $L_{M2}$ so as to rotate or twist the bearing housing about the horizontal load axis $A_{L2}$ and vertical load axis $A_{L1}$. The actuators may be hydraulic, electric or pneumatically powered.

As illustrated, a first, vertical misalignment actuator 260, mounted to the rig framework, applies loads against the vertical radial actuator 190, and preferably against the joint leg 228. The misalignment actuator 260 is connected to the joint leg 228 by a pushrod 264. The pushrod 264 is coupled to the radial actuator 190 and misalignment actuator 260 via universal joints 268, 270. In addition, a coupling collar 261 is provided around the joint leg 228 to which the pushrod 264 is connected and the load is applied from the pushrod 264 to the coupling collar 261 to the joint leg 228. This misalignment actuator applies the misalignment load in a direction that defines a first misalignment load axis $A_{M1}$ parallel to the rotational bearing axis $A_b$ and intersects the vertical radial load axis $A_{L1}$. Preferably, the first misalignment load axis $A_{M1}$ is perpendicular to the vertical radial load axis $A_{L1}$. The misalignment load creates rotation around the horizontal load axis $A_{L2}$.

The second, horizontal misalignment actuator 262, mounted to the rig framework, is connected to the bearing housing 132 with pushrods 266 via universal joints 272, 274 provided at each end of the pushrod 266. The second misalignment actuator 262 applies a horizontal misalignment load $L_{M2}$ in a direction that defines a second misalignment load axis $A_{M2}$ that is parallel to the rotational bearing axis $A_b$ and intersects the horizontal radial load axis $A_{L2}$. This misalignment load creates rotation around the vertical load axis $A_{L1}$.

To maintain the bearing housing 132 center, there is preferably an additional pair of pushrods 280, 282 coupled to the bearing housing 132 and a guide bar 284. The guide bar 284 is mounted to the rig framework table 191 (seen in FIG. 10) and may pivot about an axis of rotation $A_G$ that is perpendicular to the rotational bearing axis $A_b$. For example, a post may be inserted into the hole 285 provided in the guide bar and is affixed to the table 191. The pushrods 280, 282 are illustrated as being positioned on either side of the bearing and are connected to the bearing housing and guide bar with universal joints.

Load cells or strain gauges 290, 292 may be mounted between the various actuators and the bearing housing to measure the loads and couples applied to the bearing housing. The load cell and strain gauge output may be recorded, along with the torque measurements, with data acquisition systems for analysis. In addition, a thermocouple may be inserted into the bearing housing 132, drive shaft 110 or test shaft 120 to assess operating temperatures.

Figure 11:
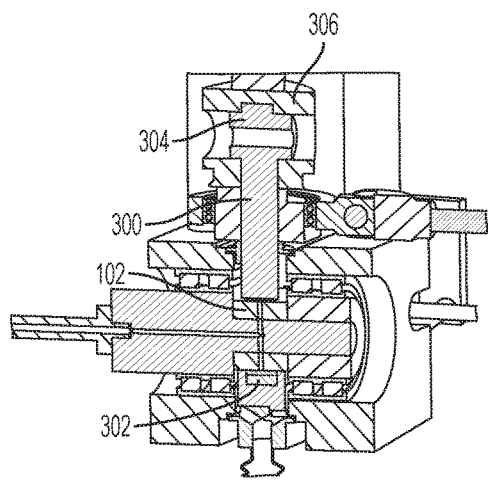
FIG. 11 illustrates a schematic of a testing arrangement using a connecting rod as the bearing housing for a heavy duty diesel engine.
Figure 13:
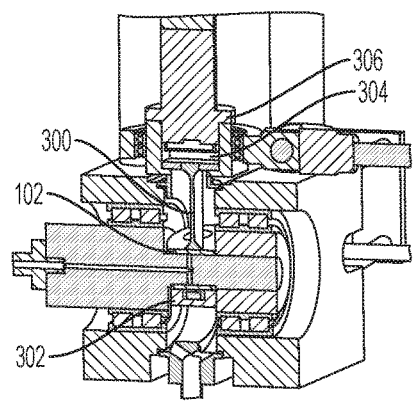
FIG. 13 illustrates a schematic of a testing arrangement using a connecting rod as the bearing housing for a light duty, 2.3 L gasoline engine.
Figure 12:
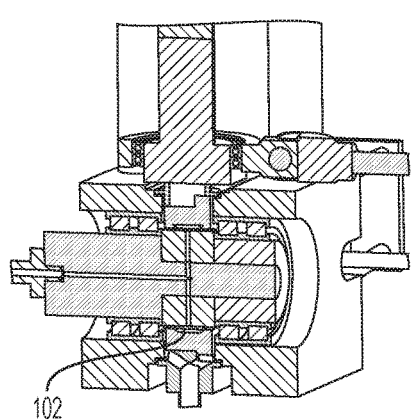
FIG. 12 illustrates a schematic of a testing arrangement for a main bearing used in a heavy duty diesel engine.
Figure 14:
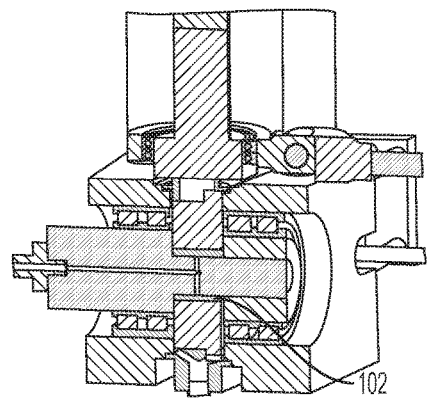
FIG. 14 illustrates a schematic of a testing arrangement for a main bearing used in a light duty, 2.3 L gasoline engine.

Various configurations of the testing rig may be provided based upon the description above for testing big end bearings and main bearings. For example, FIG. 11 illustrates a testing setup for a 15 L, 6-Cylinder heavy duty diesel engine for a big end bearing. As illustrated, a connecting rod 300 is used to form a portion of the bearing housing 132 and the bearing 102 is positioned within the big end 302 of the connecting rod 300. The drive shaft passes through the center of the bearing 102 and applies rotation to the bearing 102 as described above. The small end 304 of the connecting rod 300 is received in the bottom of the hydrostatic joint arm using an adapter 306 fashioned to receive the small end of the connecting rod. As illustrated in FIG. 12, the main bearing 102 is mounted in the testing rig as described in FIGS. 3a through 10 above. FIG. 13 illustrates a testing setup for a 2.3 L, four-cylinder, turbocharged gasoline engine, wherein the big end bearing 102 is mounted in the big end 302 of the connecting rod 300, which forms part of the bearing housing 132. The small end 304 of the connecting rod 300 is received in an adapter 306 at the bottom of the hydrostatic joint arm. FIG. 14 illustrates the testing of a main bearing 102 of the 2.3 L, four-cylinder, turbocharges gasoline engine mounted into the rig as described in FIGS. 3a through 10 above.

The testing rig is of a construction and formed of materials that minimize deformation (or displacement) of the testing apparatus to less than 0.8 mm at loads of up to 300,000 N applied by the hydraulic actuators, and preferably less than 0.5 mm, including all values and ranges therein, and such as in the range of 0.4 mm to 0.5 mm. In assessing the total displacement of the testing apparatus, i.e., the change in dimension of the actuators, pistons, hydrostatic joints, drive shaft, test shaft, columns and carrier plates are collectively evaluated and taken into account. To achieve such deformation numbers, most of the components of the testing rig may be formed of steel alloys and sliding surfaces in the hydrostatic joint such as plate 222 (see FIG. 7) and mating ring 238 (see FIG. 11) may be formed of bronze alloys, such as C93201. However, it may be appreciated that other materials may be utilized as well, provided the degree of deformation is met.

It may be appreciated that the testing rig may not only be used to examine bearing wear but also connector rod and crankshaft material wear. Further, lubricating fluid performance may be evaluated. Lubricating fluid characteristics that may be assessed include fluid viscosity over selected operating conditions, degradation, and reactivity to bearing or connector rod and test shaft materials.

Examples

Figure 15:
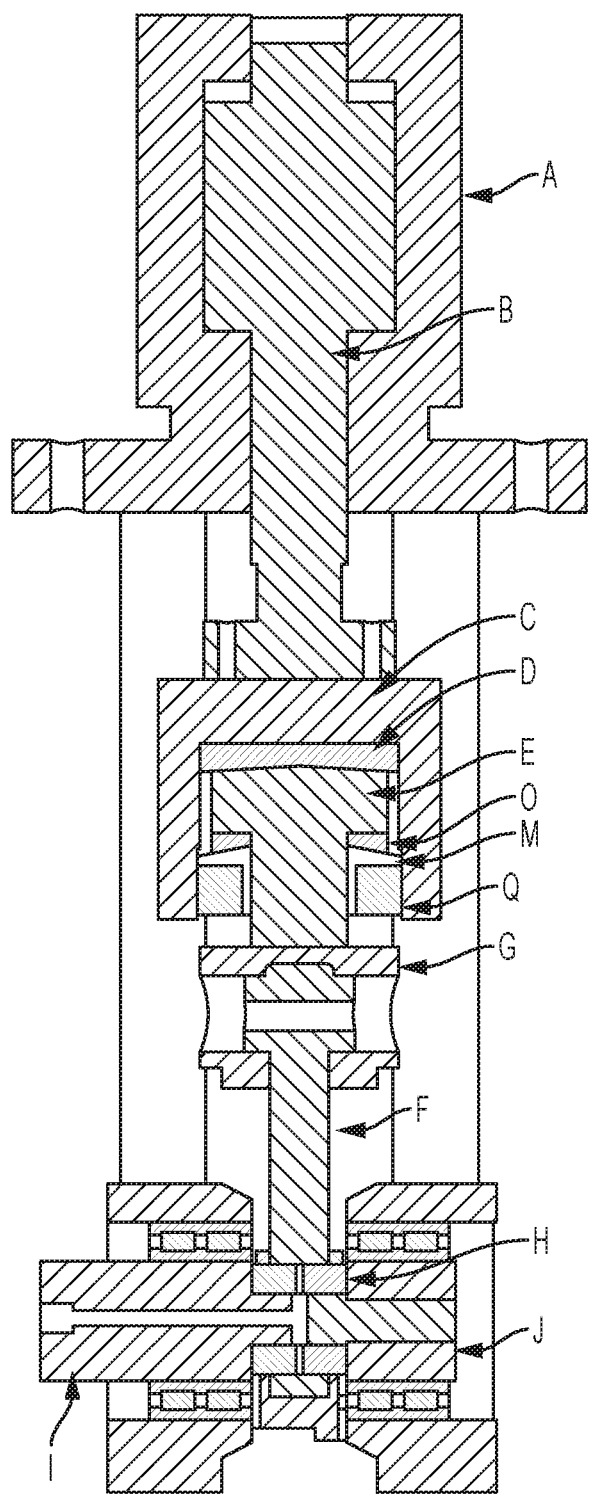
FIG. 15 illustrates a schematic of the testing arrangement used in the example.
Figure 16:
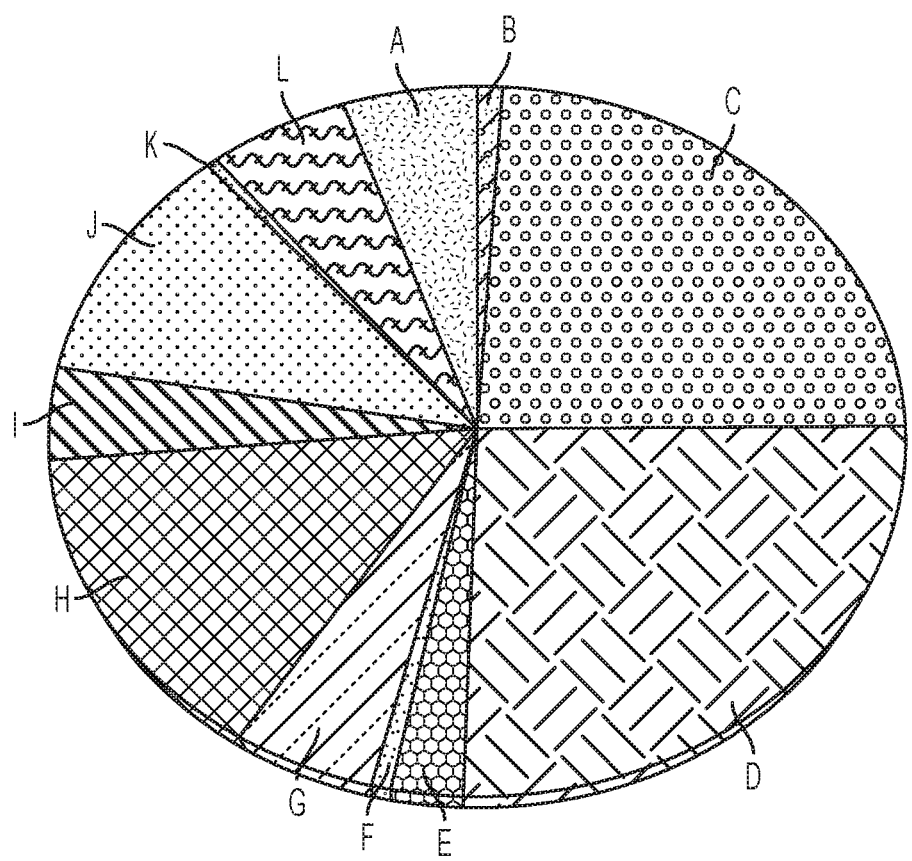
FIG. 16 illustrates a pie chart of the component stiffness of the testing rig of FIG. 15.

To examine design stiffness under dynamic load, a simplified mass-elastic, finite element analysis model of a loaded test rig was created. The analysis replicated each component and joint as shown in FIG. 15 with the various components being set forth in Table 1, which were loaded as individual components. A compressive force of 265 kN, and a tension force of 60 kN were applied in the vertical direction. These forces represent the full load cycle for duplicating the loads seen by heavy-duty diesel engines. The results of the calculations are summarized in Table 1 below. The maximum displacement is the expected movement of the rig due to loading. The stiffness distribution throughout the testing rig assembly is depicted in the pie chart of FIG. 16, reference numerals again being defined in Table 1.

It was concluded that the results were within the requirements for replicating the dynamic load cycle seen in operating various engines, including heavy-duty diesel engines. It is noted that it is believed necessary for the mechanical structure of the rig, including the body and piston of the actuator not exceed 0.8 mm of total compliance when loaded with a force of 300,000 N due to the hydraulic actuators. Preferably, compliance does not exceed 0.5 mm overall.

TABLE 1

Bearing Rig Assembly Components, Maximum Displacement and Stiffness

| Component | Material | Force (N) | Max Displacement (mm) | Stiffness (kN/mm) | Graph |
|---|---|---|---|---|---|
| Compressive Loading | | | | | |
| Hydraulic Cylinder* | Steel | 265000 | 0.0203 | 13038 | A |
| Hydraulic Piston | Steel | 264999 | 0.1016161 | 2496 | B |
| Joint Housing | Steel | 265000 | 0.004471 | 59271 | C |
| Plate | Alloy C93201 | 265000 | 0.004159 | 63717 | D |
| Joint Leg | Steel | 265000 | 0.0399 | 6643 | E |
| Conrod Dummy | Steel | 265000 | 0.15902 | 1666 | F |
| Conrod Adapter | Steel | 265000 | 0.02024 | 13093 | G |
| Conrod Sleeve | Steel | 265000 | 0.007337 | 36118 | H |
| Shaft | Steel | 265000 | 0.025397 | 10434 | I |
| Spacer Ring | Steel | 265000 | 0.0096535 | 27451 | J |
| Tension Column** | Steel | 66250 | 0.0696 | 952 | K |
| Carrier*** | Steel | 132500 | 0.0096535 | 13726 | L |
| Tension Loading | | | | | |
| Bottom Ring | Steel | 600000 | 0.0005692 | | M |
| Plate | Steel | 600000 | 0.0022868 | | N |
| Mating Ring | Bronze Alloy C93201 | 600000 | 0.0013849 | | O |
| Joint Leg | Steel | 600000 | 0.00864 | | P |
| Locking Ring | Steel | 600000 | 0.0005407 | | Q |

*4 bolt hole force application, fixed top actuator landing
**¼ full 265 kN load single column only, forced on end surface
***½ of full 265 kN load The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

The invention claimed is:
1. A testing rig, comprising:
a bearing housing, wherein the bearing housing includes an opening;
a drive shaft extending into the opening, wherein the drive shaft is rotatable around a bearing axis;
a vertical actuator mounted on the bearing housing for applying a vertical load to the bearing housing;
a horizontal actuator mounted on the bearing housing for applying a horizontal load to the bearing housing;
a first misalignment actuator coupled to the first actuator for applying a first misalignment load to the bearing housing; and
a second misalignment actuator coupled to the bearing housing for applying a second misalignment load to the bearing housing.

2. The testing rig of claim 1, wherein the vertical load is applied in a direction that defines a vertical load axis and the vertical load axis intersects the bearing axis, the horizontal load is applied in a direction that defines a horizontal load axis and the horizontal load axis intersects the bearing axis and the vertical load axis, the first misalignment load is applied in a direction that defines a first misalignment axis and the first misalignment axis intersects the vertical load axis and is parallel to the bearing axis, and the second misalignment load is applied in a direction that defines a second misalignment load axis that intersects the horizontal load axis and is parallel to the bearing axis.

3. The test rig of claim 1, wherein a bearing is mounted on at least a portion of the drive shaft that is received in the opening in the bearing housing.

4. The test rig of claim 1, wherein the bearing housing includes a big end of a connector rod and a small end of the connector rod is received in an adaptor affixed to the vertical actuator.

5. The test rig of claim 4, wherein the first and second hydrostatic pivot joints each include at least one pair of mating arcuate surfaces.

6. The test rig of claim 1, further comprising a first hydrostatic joint coupling the vertical actuator to the bearing housing, wherein the first misalignment load is applied to the hydrostatic joint; and a second hydrostatic joint coupling the horizontal actuator to the bearing housing.

7. The test rig of claim 6, wherein the vertical and horizontal actuators each comprise a reciprocating piston and the hydrostatic pivot joints each include a joint housing affixed to the reciprocating piston and a joint leg that pivots within the joint housing and contacts the bearing housing.

8. The test rig of claim 7, wherein the joint housing includes hydraulic fluid.

9. The test rig of claim 1, further comprising a test shaft mounted on the drive shaft, wherein a bearing is positioned on the test shaft.

10. The test rig of claim 1, wherein the drive shaft includes an interchangeable mandrel that is received in the bearing housing.

11. The test rig of claim 10, wherein the mandrel extends through the bearing housing and is supported by at least one support bearing within a main housing mounted to the bearing housing.

12. The test rig of claim 1, further comprising a lubricating fluid flow path defined in the drive shaft including a radial drilling for providing lubricating fluid into the bearing housing.

13. The test rig of claim 1, further comprising a flywheel mounted to the drive shaft.

14. The test rig of claim 1, further comprising a torque meter mounted on the drive shaft.

15. The test rig of claim 1, further comprising a first pushrod coupling the first misalignment actuator to the vertical actuator, wherein the first pushrod is coupled to the first misalignment actuator and the vertical actuator with universal joints at each end of the pushrod.

16. The test rig of claim 1, further comprising a second pushrod coupled to the second misalignment actuator and the bearing housing, wherein the second pushrod is coupled to the second misalignment actuator and the bearing housing with universal joints at each end of the pushrod.

17. The test rig of claim 1, further comprising rig framework on which the bearing housing is rotatably mounted; and a guidebar coupled to the bearing housing and pivotably coupled to the rig framework, wherein the guidebar allows rotation of the bearing housing around the vertical load axis and the bearing axis.

18. The test rig of claim 17, wherein the guidebar is coupled to the bearing housing by a third pushrod and a fourth pushrod positioned at each end of the guidebar and the third and fourth pushrods are coupled to the bearing housing and the guidebars with universal joints positioned at each end of the third and fourth pushrods.

19. A method of testing a bearing operating conditions comprising:

rotating a bearing within a bearing housing around a bearing axis defined by the bearing, wherein the bearing is rotated by a drive shaft upon which the bearing is mounted;

applying a vertical load to the bearing housing and the bearing in a direction defining a vertical load axis that intersects the bearing axis with a vertical actuator mounted on the bearing housing;

applying a horizontal load to the bearing housing and the bearing in a direction defining a horizontal load axis that intersects the bearing axis and the vertical load axis with a horizontal actuator mounted on the bearing housing;

applying a first misalignment load to the vertical actuator with a first misalignment actuator, wherein the first misalignment load intersects the vertical load axis and is parallel to the bearing axis to twist the bearing housing around the horizontal load axis; and applying a second misalignment load to the bearing housing, wherein the second misalignment load intersects the horizontal load axis and is parallel to the bearing axis to twist the bearing housing around the vertical load axis.

20. The method of claim 19, further comprising supplying a lubricating fluid to the bearing housing and the bearing.

* * * * *